E. C. SHEPARD.
Magneto-Electric Machine.

No. 15,596.

4 Sheets—Sheet 1.

Patented Aug. 19, 1856.

E. C. SHEPARD.
Magneto-Electric Machine.

No. 15,596.

4 Sheets—Sheet 2.

Patented Aug. 19, 1856.

E. C. SHEPARD.
Magneto-Electric Machine.

No. 15,596.

4 Sheets—Sheet 3.

Patented Aug. 19, 1856.

E. C. SHEPARD.
Magneto-Electric Apparatus.
No. 15,596.
4 Sheets—Sheet 4.
Patented Aug. 19, 1856.
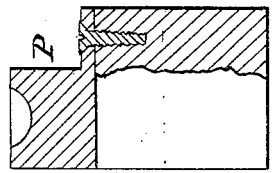
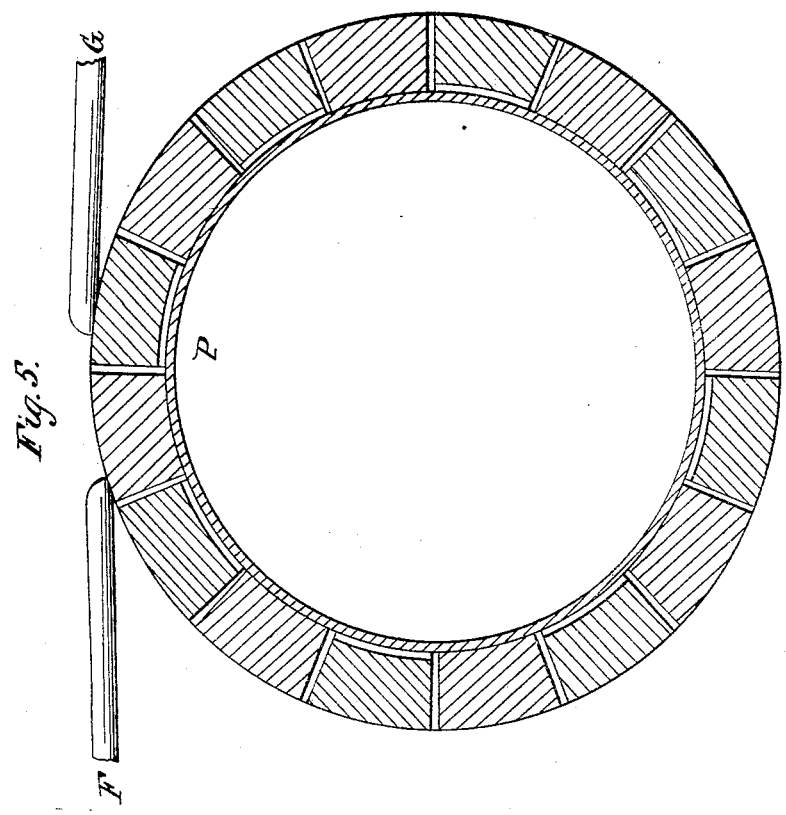
Fig. 5.

UNITED STATES PATENT OFFICE.

EDWARD C. SHEPARD, OF NEW YORK, N. Y.

IMPROVEMENT IN MAGNETO-ELECTRIC MACHINES.

Specification forming part of Letters Patent No. 15,596, dated August 19, 1856.

*To all whom it may concern:*

Be it known that I, EDWARD CLARENCE SHEPARD, of the city, county, and State of New York, have invented a new and useful Improvement in the Magneto-Electric Apparatus; and I do hereby declare that the following is a full, clear, and exact description of the same, reference being had to the annexed drawings, forming part hereof, in which—

Figure 1:
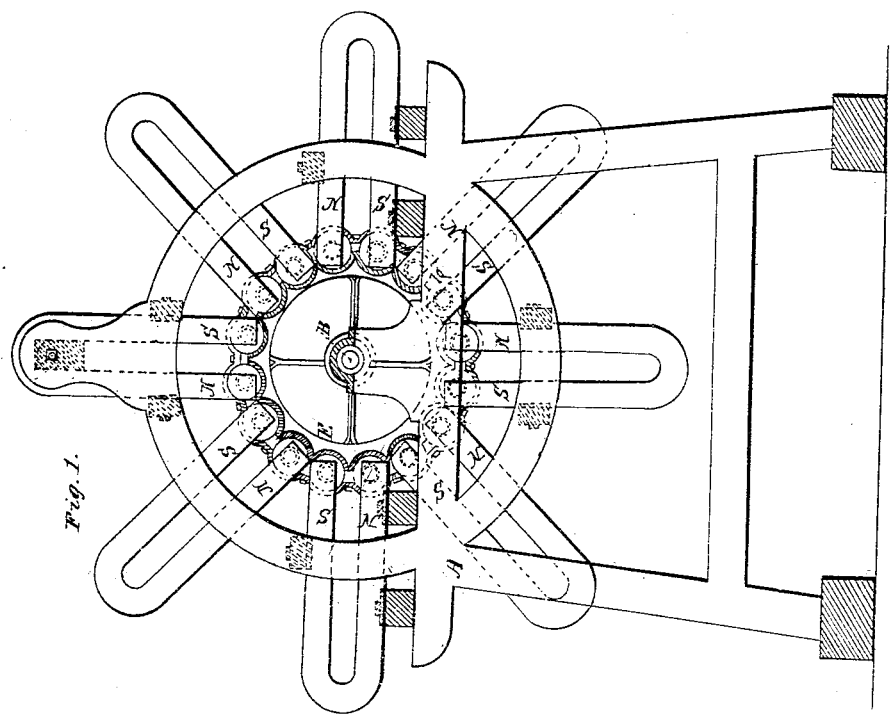
Figure 2:
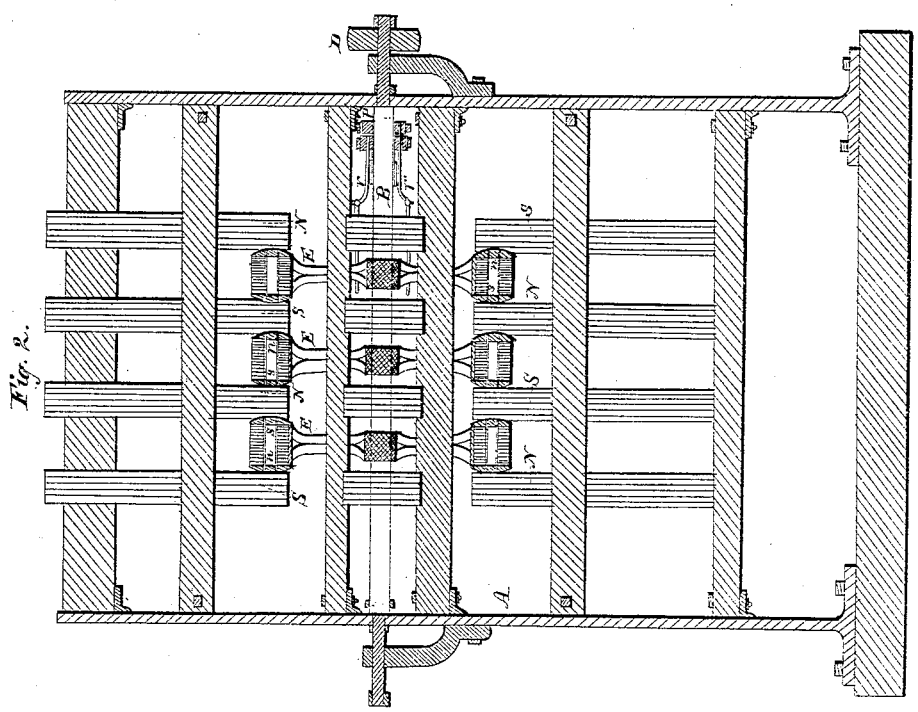
Figure 3:
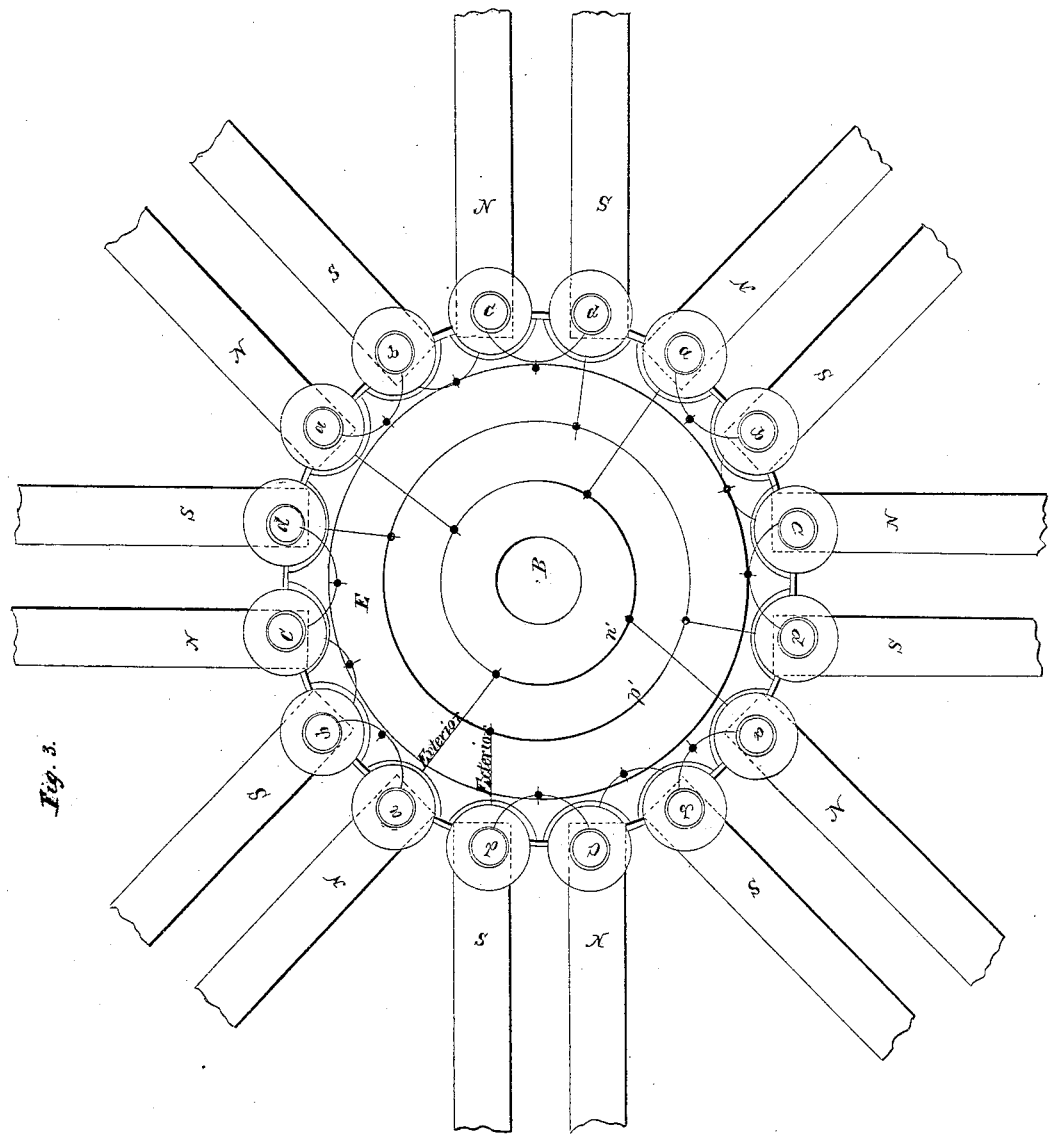
Figure 4:
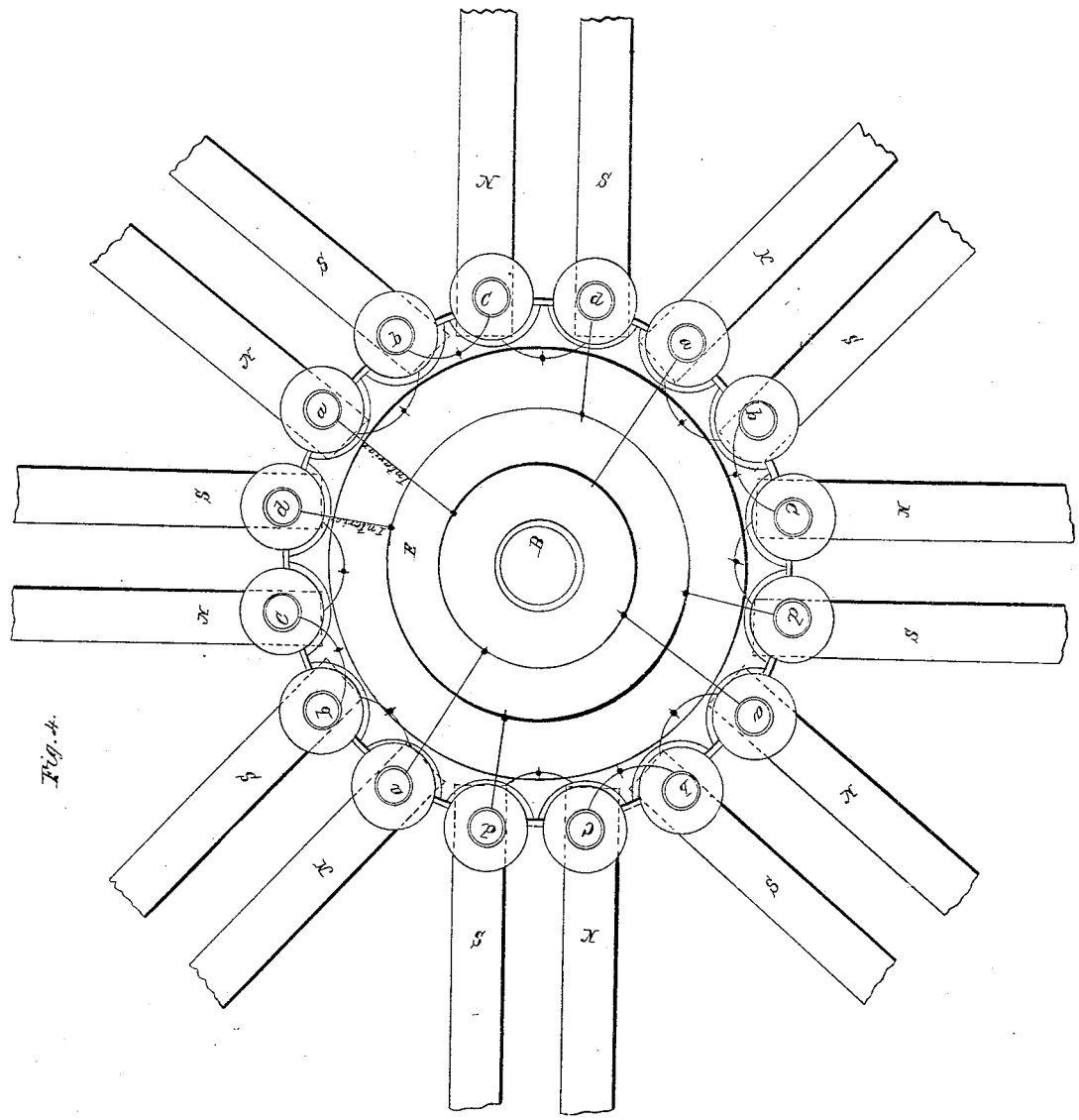

Figure 1 is an end view of the magneto-electric apparatus, showing the position of the magnets and helices. Fig. 2 is a vertical longitudinal section taken through the center of the machine. Fig. 3 is a view showing, on a large scale, the mode of connecting the ends of the helices, which I designate the "exteriors." Fig. 4 is a view showing the connection of ends, designated as "interiors." Fig. 5 is a cross-section of the pole-changer.

Similar characters of reference in the several figures denote the same parts.

The nature of my invention consists in the peculiar means and combination of apparatus hereinafter described for uniting and forming a circuit or circuits and producing and concentrating or aggregating electric currents or power, which act with greater advantage than by any mode heretofore known for the several purposes to which such currents or power are applicable.

My magneto-electric apparatus is composed of several permanent magnets, N S, with their ends placed in the planes of several vertical circles, and between every two of which circles is mounted a wheel, E, having a series of helices or coils of insulated wire fixed on its periphery, so that when the wheel revolves it shall cause the helices to pass between the sides of the ends of the magnets composing the circles for the purpose of creating induced electric currents. All the magnets in each circle must be so arranged that their north and south poles shall follow each other in regular order, so that in each circle of magnets (whether they be horseshoe magnets or magnets of any other form) there shall be a north pole and south pole alternately around it.

In the circles of magnets of which my machine is composed the poles in adjoining circles must follow in reverse order to each other, so that a north pole shall always have a south pole opposite to it in the circle of magnets on each side of it; or, in other words, every helix must at any given moment pass between and be acted upon by the north pole of the magnet at one end of it and the south pole of a magnet at the other end of it.

The several wheels E of helices are secured to a shaft, B, supported by a suitable frame, A, so as to turn in bearings bolted thereto by power applied to a pulley, D, keyed to the said shaft, which shaft should be of a size suited to the size of the machine.

The wheels E, to which the helices are secured, may be made of any suitable material, (I prefer brass,) and may consist of any number, from two upward. Each of these wheels is mounted between two circles of magnets, N S, or poles, so that each circle of magnets or poles, except those at the ends of the machine, (see Fig. 2,) may be enabled simultaneously to act upon two circles of revolving helices or coils. These wheels are to be securely keyed on the shaft B. The rim or flange of each of these wheels is cut with recesses for the reception of the helices. In the drawings sixteen helices are shown on each wheel. The thickness of each wheel at its periphery is to be somewhat less than the length of the helices between the outsides of their disks, so as to admit of the helices being shifted slightly endwise for adjustment. Great care must be taken in keying these wheels on the axle, so as to have the corresponding helices in each of the wheels placed in the prolongation of each other—that is to say, placed in straight lines drawn at right angles across the periphery of each wheel. The helices are fastened to the wheels by bands or binders of any suitable material.

The cores of the helices must be made of any soft iron and be well annealed, about four inches in length, and nearly two inches diameter at the bore. They are represented in Fig. 2 by the letters $n$ $s$. A disk of proper material is cemented on each end of the core.

Each helix is composed of about six hundred feet of No. 18 copper wire, covered with cotton or any other insulating substance, and wound on iron tubes, either in one strand or in several strands; but this, as well as the size of the coils, may be varied to suit the requirements of the machine.

By making the connections with the proper ends of the wire forming the helices or coils all the currents of the helices for the time being in action may be united together in the machine, forming one grand current. There must of necessity be separate break-pieces and commutators, because the reversions do not take place at the same time.

Fixed to one side of each of the wheels E, but insulated from it, are two metallic conducting rings, $p'$ $n'$, serving as collecting bands or points for the currents generated in the helices. For instance, in Fig. 3 the two conducting-rings receive each four exteriors—that is, what is termed the "exterior" wires of the helices. Thus, the connections between these exteriors and the conducting bands or rings and between the intervening helices themselves are formed in the following manner, to wit: You connect the exterior wire of the helix $a$ with the conducting-ring $n'$, then the interior wire of $a'$ with the interior wire of helix $b$, the exterior wire, $b$, with the exterior of helix $c$, the interior wire of helix $c$ with the interior of helix $d$, the exterior wire of helix $d$ being connected with the conducting band or ring $p'$, and so on, bringing every fourth exterior wire into the conducting-ring $p'$, and bringing every first exterior wire into the conducting-ring $n'$, and, as shown in Fig. 4, bringing every first interior wire into the center conducting-ring, $n'$, and every fourth interior wire into the conducting-ring $p'$, and so on in sets, one wheel of helices being connected by the exterior wires with the conducting-rings $p'$ $n'$, and the next wheel of helices being connected with the conducting-ring $p'$ $n'$ by their interior wires, so connecting them in sets to any extent that may be required.

The connections may be made by drilling in the conducting-rings $p'$ $n'$ a small hole for the end of each wire, and securing the wire to it by a small wedge of half-round wire, care being taken to have all the surfaces in contact clean and bright.

Two or more metallic rods, $r$ $r'$, pass through the conducting-rings, one rod connecting all the rings marked $p'$ together and the other rod connecting all the rings $n'$ together, thus each rod transmitting the currents of all the rings which it connects together in a single current to the pole-changer or frotteur P, by which direction is given to the aggregate current. There should be a binding-screw in each ring to pinch the rod passing through it, in order to make sure of the metallic circuit and electric current being complete.

The frotteur P (seen in Fig. 2 and shown in cross-section in Fig. 5) consists of two metallic disks or wheels, made in a manner well known to all acquainted with the subject, which are screwed or cemented on a cylinder of hard wood or ivory to insulate them from the axle, and are insulated from each other by being a little distance apart or by thin disks of any non-conducting material. One of the rods $r$ or $r'$, passing through the conducting-rings connecting all the exterior rings, $p'$, is then fastened into one plate of the frotteur, and the other wire, connecting all the rings $n'$ together, is then passed through the first plate of the frotteur and fastened to the other plate, being insulated from the first plate by an ivory ferrule, as shown in Fig. 2.

There are two springs, F and G, pressing on each of the frotteur-plates, one receiving the aggregate current of all the interior rings, $n'$, and the other the aggregate current from all the exterior rings, $p'$, and so adjusted that as one plate leaves one of the springs the other plate is leaving the other spring, and thus in the revolution of the shaft B these springs are made to change alternately from one frotteur-plate to the other, thus giving the desired direction to the aggregate current, as shown in Fig. 5.

If it be desired, there may be four metallic disks or wheels, forming two pairs for each machine, or more, if necessary, depending on the wheels of helices used in each machine and on the number of aggregate currents which the operator may desire to employ.

It may be stated that, instead of two conducting-rings receiving the currents of the connecting helices, one ring may be employed, or, if it be desired, the wires which now lead to these rings may be carried through the machine and their currents united in the rods leading to the frotteur-plates. This would, however, be inconvenient in practice, but may be used.

I would here state that in the machine figured in the drawings I have made use of eight magnets in each magnetic circle, each magnet composed of six (there may be more) plates of very hard-tempered cast-steel, about two inches wide and half an inch thick, and from eighteen to nineteen inches in length when bent, the distance between the poles being about two inches.

Instead of the machine described above, in which the axle is horizontal, I design to construct machines with vertical axles for adapting them to use on shipboard or other purposes.

The currents of electricity herein-above described may be conducted to any apparatus and for any purpose to which such currents may be applied to produce any of the desired results which are to be obtained by the applications of electrical currents.

Having thus described the nature of my invention and the manner of constructing the same, I would have it understood that I do not claim the helices, the connecting bands or rings $p'$ $n'$, the connecting-rods, the frotteur-plates, or the springs F and G individually; but

What I do claim as my invention, and desire to secure by Letters Patent, is—

The springs F and G, the frotteur-plates P, the connecting-rods $r$ $r'$, and the conducting bands or rings $p'$ $n'$, when these are combined with helices in sets of four, said helices being united among themselves and by thin terminal wires with the rings $p'$ $n'$ or their mechanical equivalents, so as to collect and aggregate in one current the several currents generated in the said helices when revolved between the magnetic poles, as hereinbefore described and set forth.

In testimony whereof I have hereunto signed my name before two subscribing witnesses.

EDWARD CLARENCE SHEPARD.

Witnesses:
R. H. GILLET,
VINCENT MARR.